(No Model.)

A. BERTRAM.
STACKER.

No. 596,453.  Patented Dec. 28, 1897.

WITNESSES:
H. E. Chase,
G. A. Wright.

INVENTOR
August Bertram
BY
ATTORNEYS.

(No Model.)

A. BERTRAM.
STACKER.

Patented Dec. 28, 1897.

WITNESSES:

INVENTOR

BY

ATTORNEYS.

(No Model.)

A. BERTRAM.
STACKER.

No. 596,453.

Patented Dec. 28, 1897.

WITNESSES:
H. E. Chase,
G. A. Wright

INVENTOR
August Bertram

BY
Wilkinson & Parsons
ATTORNEYS.

(No Model.)  9 Sheets—Sheet 6.

A. BERTRAM.
STACKER.

No. 596,453.  Patented Dec. 28, 1897.

WITNESSES:
H. E. Chase,
G. A. Wright.

INVENTOR
August Bertram
BY
Hey Wilkinson Pareme
ATTORNEYS.

(No Model.)  9 Sheets—Sheet 7.

A. BERTRAM.
STACKER.

No. 596,453. Patented Dec. 28, 1897.

WITNESSES:
H. C. Chase,
G. A. Wright.

INVENTOR
August Bertram
BY
Wilkinson Parsons
ATTORNEYS.

(No Model.) 9 Sheets—Sheet 8.

A. BERTRAM.
STACKER.

No. 596,453. Patented Dec. 28, 1897.

WITNESSES:
H. E. Chase,
G. A. Wright.

INVENTOR
August Bertram
BY
Hey Wilkinson Parsons
ATTORNEYS.

(No Model.) 9 Sheets—Sheet 9.

A. BERTRAM.
STACKER.

No. 596,453. Patented Dec. 28, 1897.

WITNESSES:

INVENTOR
August Bertram

BY
Hey, Wilkinson & Parsons
ATTORNEYS.

UNITED STATES PATENT OFFICE.

AUGUST BERTRAM, OF NEW YORK, N. Y., ASSIGNOR, BY MESNE ASSIGNMENTS, TO DE FOREST SETTLE, RECEIVER OF THE INTERNATIONAL POSTAL SUPPLY COMPANY, OF SAME PLACE.

STACKER.

SPECIFICATION forming part of Letters Patent No. 596,453, dated December 28, 1897.

Application filed January 29, 1892. Serial No. 419,629. (No model.)

*To all whom it may concern:*

Be it known that I, AUGUST BERTRAM, of the city of New York, in the county of New York, in the State of New York, have invented new and useful Improvements in Stackers, of which the following, taken in connection with the accompanying drawings, is a full, clear, and exact description.

My invention relates to improvements in stackers for assembling and delivering cards, letters, sheets of paper, envelops, and analogous articles upon a receiving table or tray; and to this end it consists, essentially, of mechanism so adapted and arranged as to be automatically actuated by the articles to be stacked, whereby said articles are stacked or assembled and delivered with greater accuracy and speed than by previous devices of this character.

The invention furthermore consists in an assembling-carrier, a feeder for presenting to the carrier the articles to be stacked, and a suitable contact-piece so arranged and connected to the carrier as to actuate the same by the encounter of said articles and contact-piece in the transit of the articles from the feeder to the carrier.

The invention still furthermore consists in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figures 1 and 2 are respectively a top plan view and a side elevation of my invention, illustrating the general construction and arrangement of its parts, Fig. 1 showing also a portion of the table of a letter-marking machine having mounted thereon marking and presser rollers. Fig. 11 is a horizontal sectional view, taken on line 11 11, Fig. 8, for further illustrating the general construction and operation of the dog adapted to engage the ratchet-wheel on the assembling-carrier shaft, the movable support for said dog, and the cam for bringing the dog into operation. Fig. 16 is a detail sectional view, taken on line 16 16, Fig. 1, representing a rib or guide on the machine to which my stacker is attached and the way on the receiving or stacking table or tray for receiving said rib. Fig. 17 is an isometric perspective of the detached plate for stopping the transverse movement of the articles to be stacked across the receiving table or tray.

It is well known that at present great difficulty is experienced in practically stacking or successively arranging one against the other quickly-discharged cards, letters, sheets of paper, envelops, and analogous articles, and particularly the letters fed from a letter-marking machine. This operation has been measurably effected by devices possessing a constantly-operating follower movable against the cards, letters, or other articles, or continually operating to engage said articles and carry them to a receiving table or tray. Moreover, stackers operating as described and suitable for use with letter-marking machines or similar devices discharging letters or analogous articles with great rapidity have provided for a downward feeding of the letters, occasioned either by force of gravity or by positively-acting feeding devices.

My present invention is particularly differentiated from the aforesaid types of stackers in that the letter or other article to be stacked is utilized to bring into action mechanism for feeding the same along the receiving or assembling table or tray. It is further differentiated in that the stacking table or tray is preferably in substantially the same horizontal plane as the base of the marking or feeding rollers of the letter or other delivering machine for the letters or other articles to be stacked, whereby said articles feed into a substantially horizontal plane without excessive downward movement.

In order that my invention may be readily understood, I have herein shown and described as an example thereof a construction adapted to be operated in connection with an automatic letter-marking machine operating with great speed, and thus necessitating the use of a speedy and accurate stacking device to receive and assemble the letters discharged or fed from the letter-marking machine. It will be readily apparent, however, upon an examination of my invention that the same may be used singly or with machines other than letter-marking machines and that its construction may be varied to conform to its required use without material change in the essentials or departure from the spirit of my invention.

A represents a portion of the table of any suitable construction of machine, as a mail-matter-marking machine, to which my stacker is to be attached, and B and C suitable feeding mechanism, consisting, preferably, in a marking-machine, of presser and marking rollers mounted upon the respective shafts $b$ and $c$, the shaft $b$ being journaled in a movable bearing B', pivoted at B² to the table, and the shaft $c$ being journaled directly in the table A.

The table A and rollers B and C are, it is evident, of any desirable form, size, and construction, providing the rollers B and C are capable of feeding the letters with the required force to the receiving or assembling table or tray D, and it is therefore unnecessary to further describe the construction or arrangement of these parts, it being evident that instead of feeding the letters forward by a marking-roller any other desired form of feeding mechanism may be utilized.

The table or tray D is disposed in a horizontal plane a trifle lower but substantially coincident with that of the table A of the mail-matter-marking machine and is arranged lengthwise along the edge $a$ thereof. It is frequently desirable to permit access to the feeding mechanism, as the marking and presser rollers B and C, and for this reason I provide the table A with forwardly-extending guides or ribs A', movable in ways or grooves $d$ in the under face of the table or tray D, whereby the same may be readily withdrawn a sufficient distance from the adjacent edge $a$ of the table A.

For the purpose of reducing to a minimum the friction of the articles to be stacked incident to their lengthwise travel of the table or tray D, I provide an assembling-carrier movable lengthwise of the table D and consisting, essentially, of suitable flexible aprons E E E, movable over driving-wheels $e\ e\ e$ and idler-drums $e'\ e'\ e'$, mounted, respectively, upon the shafts E' and E², journaled in the bearings $e^2$ and $e^3$, depending from the under face of the table or tray D. The top portion of said aprons interposed between the drums $e\ e\ e$ and $e'\ e'\ e'$ forms the operative part of the carrier and slightly projects above the top face of the table or tray D, being movable in grooves $d'\ d'\ d'$ therein.

To facilitate an easy movement of the carrier, it is provided at intervals with a series of antifriction-rollers E³, journaled in the links $e^4$, composing said carrier. These rollers are movable along wearing-plates $d^2\ d^2\ d^2$ at the base of the grooves $d'\ d'\ d'$ and bear against the periphery of the drivers $e\ e\ e$ and the idler-drums $e'\ e'\ e'$ and against the teeth $e^5$ of the drivers $e\ e\ e$ as said drivers are operated to move the carrier. It is evident, however, that a single apron may be used instead of three and that the detail construction of the apron forms no essential part of my invention.

The articles to be stacked are, as presently stated, fed edgewise upon the assembling-carrier E against a stop-plate F, resting upon the carrier and provided with an eye $f$, movable upon a rod F', suitably supported at the side of the carrier in upwardly-projecting eyes $f'\ f'$, provided at the opposite extremities of the table or tray D.

G is an upright wall or plate at the rear edge of the table or tray D, along the front face of which the articles to be stacked are fed by the rollers B and C. This plate may be formed integral with the table D, but is here illustrated as removably secured thereto by screws g. At the lower edge of the plate is a projecting downwardly-inclining shoulder G' for supporting the lower edge of the articles to be stacked, and directly above this shoulder is a groove or recess G², which obviates blurring of the mark or stamp impressed upon the letter by the marking-roller B, as the portion of the letter having the mark thereon is free to yield backwardly when its front face encounters the rear face of the previously-stacked letters.

The contact-piece H for bringing the carrier mechanism into operation upon the presence of the article to be stacked forms an essential feature of my invention and consists, essentially, of a movable bar or lever h, pivoted at h' at the rear of the upright wall G, and a front engaging face h², adapted to project beyond the front face of the plate or wall G through a slot or cut-out G³ therein for making contact with said article, which is movable along said wall G. The engaging face h² consists, preferably, of a loosely-revoluble roller mounted upon a pin h³, supported by the end of the bar or lever h, forced into its normal position by a suitable spring H⁴. The amount of projection of the roller or engaging face h² of the contact-piece H is regulated by an adjuster H', consisting of a screw movably mounted on the bar or lever h and adapted to bear against the rear face of the wall G.

Figures 2, 3, 4:
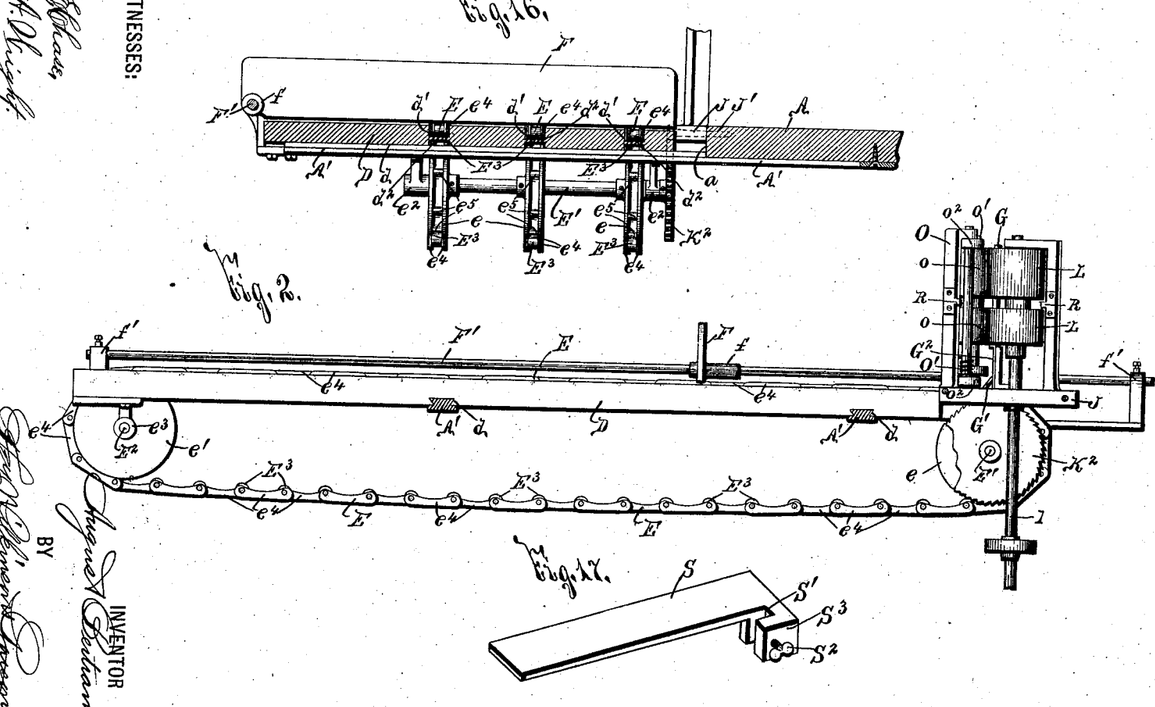
Figure 3:
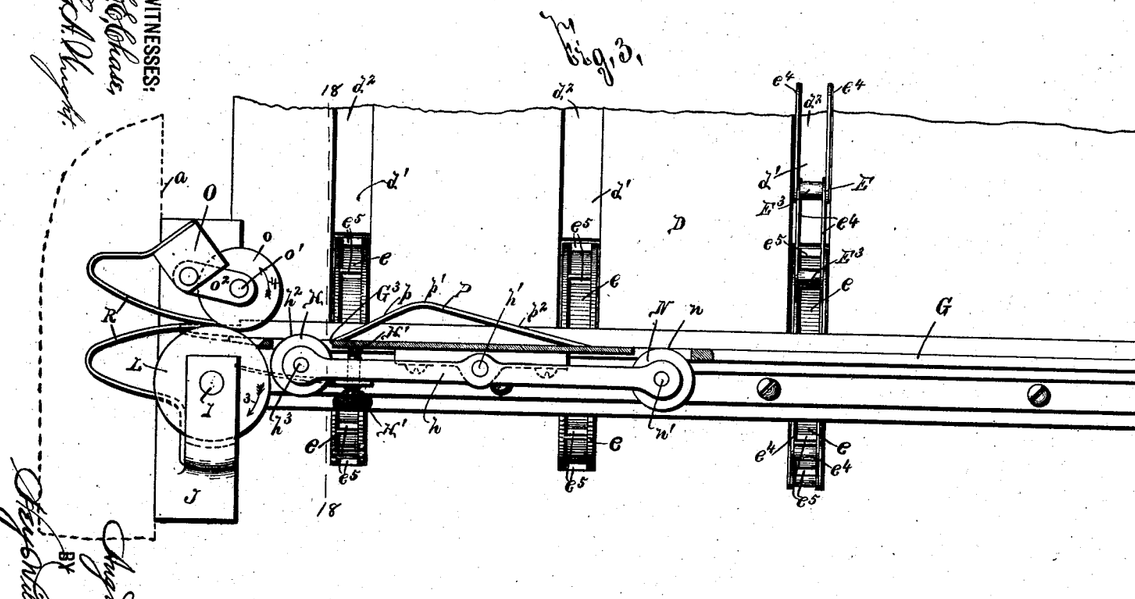
Fig. 3 is an enlarged top plan view, partly in section, of the rear extremity of the receiving or stacking table, further illustrating the detail construction and arrangement of its parts, and particularly the separate contact-pieces movable into and out of the path of the articles to be stacked for controlling the action of the movable or assembling carrier.
Figures 4, 5:
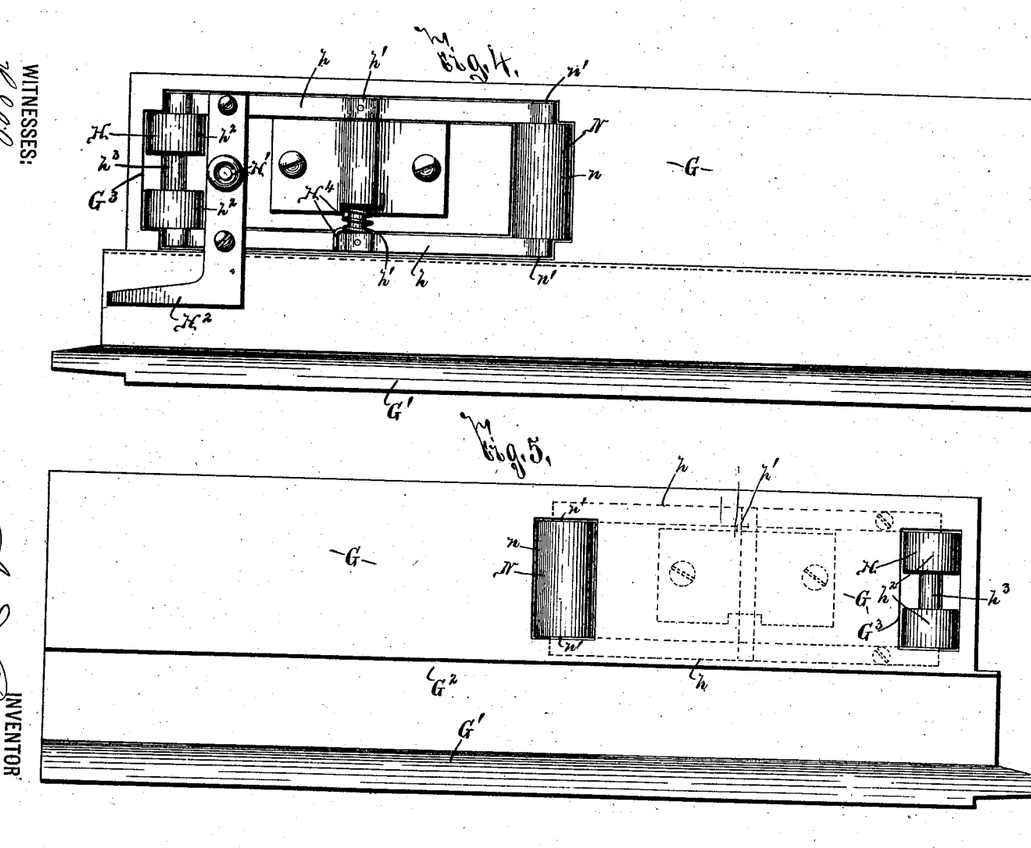
Figs. 4 and 5 are respectively rear and front faces of the rear upright wall along which the articles to be stacked are fed to the carrier.
Figure 6:
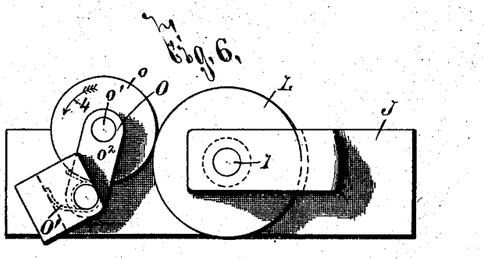
Figs. 6 and 7 are respectively a top plan and outer side elevation of the feeder and the oppositely-arranged movable roller for increasing the feed of the carrier, the sprocket-carrying shaft of the carrier, and the wheel mounted on said shaft for rotating the same.
Figure 8:
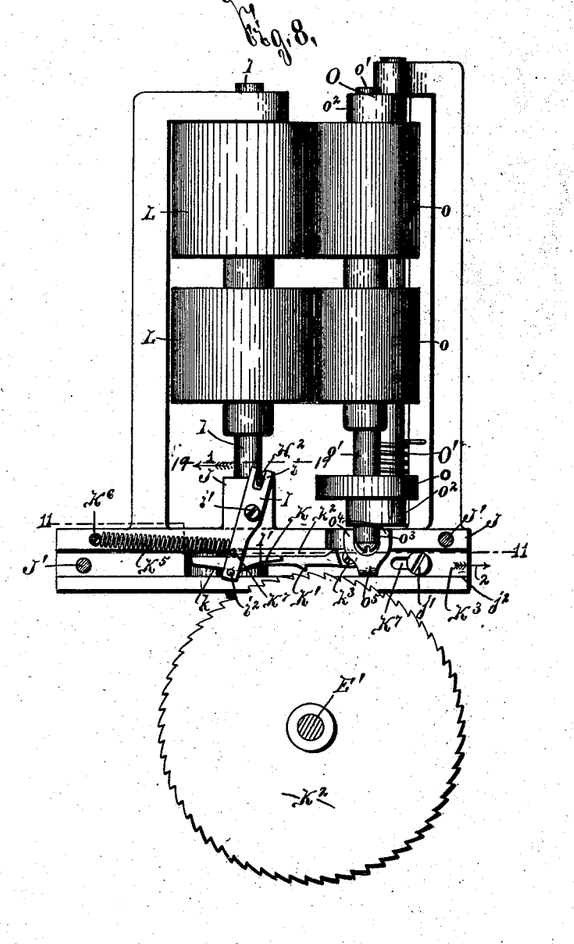
Fig. 8 is an inner side elevation of the parts as shown at Figs. 6 and 7, illustrating clearly the construction of the connecting mechanism between the actuating-wheel on the carrier-shaft, the movable contact-piece, and the movable roller oppositely arranged to the feeder.
Figure 9:
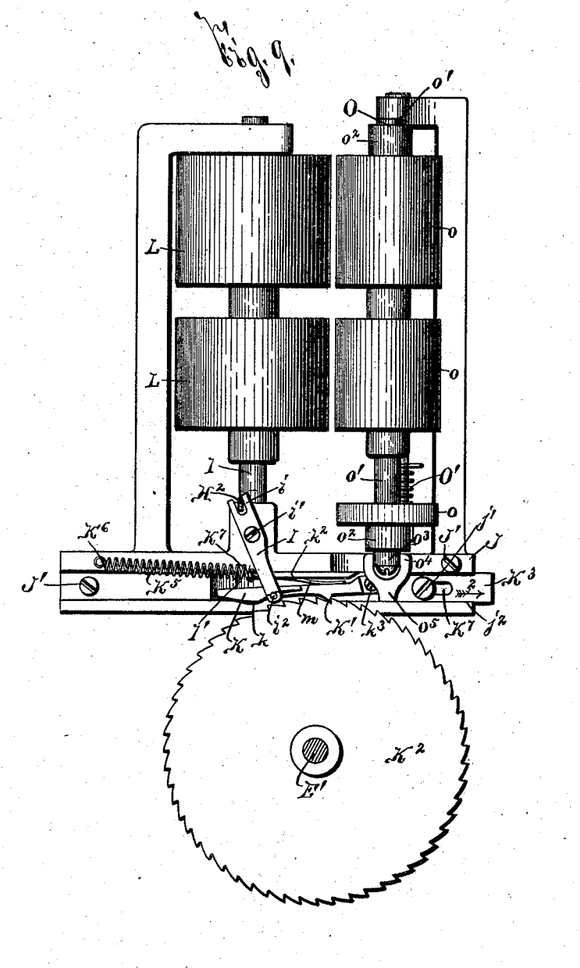
Fig. 9 is a similar view to Fig. 8, representing the movable dog controlled by the contact-piece as engaged with the actuating-wheel on the carrier-shaft for effecting the rotation of said shaft and the movable engaging face or roller oppositely arranged with the feeder as having partially rotated the actuating-wheel.
Figures 9, 10, 12, 13, 14, 15:
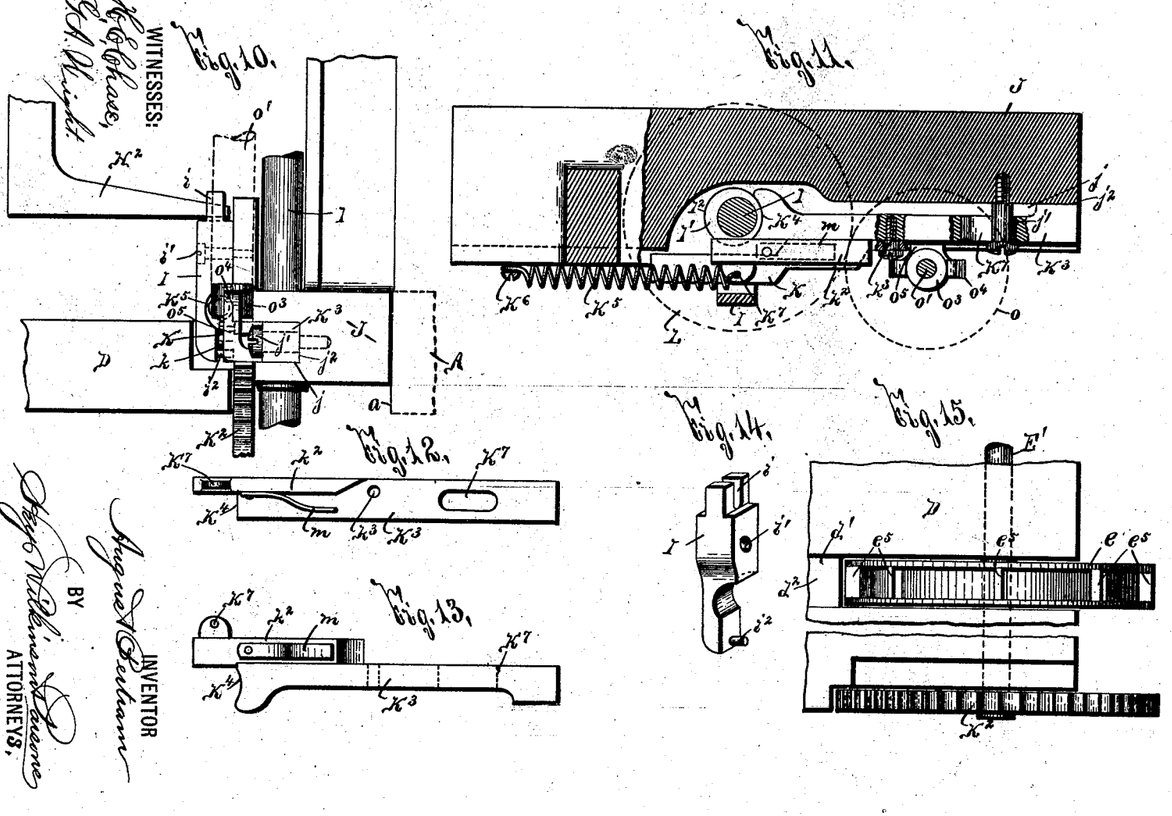
Fig. 10 is a detached end elevation of the lower extremity of the parts as shown at Figs. 7, 8, and 9, the actuating or ratchet wheel and its shaft being omitted.
Figs. 12 and 13 are respectively a side elevation and inverted plan view of the movable support for the dog adapted to engage the actuating or ratchet wheel on the carrier-shaft.
Fig. 14 is an isometric perspective of the lever for controlling the operation of the dog for engaging said actuating-wheel.
Fig. 15 is a detail view, partly in section, of one of the detached extremities of the rear end of the receiving table or tray.
Figure 18:
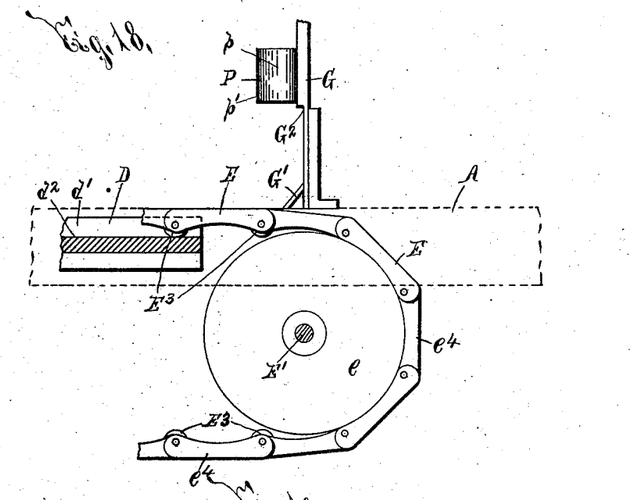
Fig. 18 is a detail vertical sectional view taken on line 18 18, Fig. 3.
Figure 19:
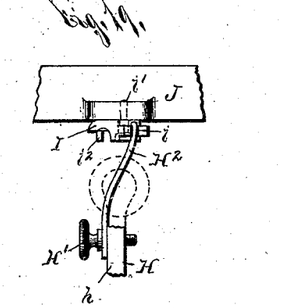
Fig. 19 is a detail horizontal sectional view taken on line 19 19, Fig. 8.

At the lower edge of the bar or lever h, best shown at Fig. 4 as consisting of corresponding strips, is a projecting arm H², which engages the forked end i of a lever I, pivoted at i' to a bracket J, suitably supported upon the frame A by bolts J' in the required proximity to the end of the upright G and the contact-piece H. The lower end of the lever I is formed with a projecting shoulder i², adapted to ride along a suitably curved or inclined bearing-face k of a ratchet-dog K, formed with a tooth K', adapted to engage an actuating or ratchet wheel K², rigidly secured to the shaft E' of the assembling-carrier driver e. The face k is convex, and when in its normal position the shoulder i² engages the central convex portion of said face and holds the tooth K' out of engagement with the ratchet-wheel K². As the upper end of the lever I is forced forwardly, as shown by the arrow 1 at Fig. 8, the shoulder i² is rocked backwardly, as shown at Fig. 9, and permits the tooth K' of the dog K to fall into engagement with the wheel K², which action is facilitated by the operation of a spring m, interposed between said dog K and a shoulder k² of a support K³ or sliding block, to which the dog K is pivoted at k³. After the dog K is forced forwardly, as presently described, for partially rotating the ratchet-wheel K², it is then retracted, as also presently described, and simultaneously the resetting-finger, also presently described, is operated to rock the lever I into its normal position for holding the tooth K' out of engagement with the ratchet-wheel K².

A constantly-rotating shaft l, which may be utilized for operating any suitable construction of feeder for the articles to be stacked, is journaled in suitable proximity to the contact-piece H and the ratchet-dog K and is here shown as journaled in the bracket J, previously described. Upon this shaft, as best seen at Fig. 11, is a cam l', which moves the dog K lengthwise and partially rotates the ratchet-wheel K² when engaged by the dog, as previously stated, thereby moving the carrier. Instead of operating directly upon the dog K the cam engages the front end K⁴ of the support or sliding block K³, previously referred to, to which the dog K is pivoted at k³, thereby forcing the dog forwardly in the direction illustrated by arrows 2 at Figs. 8 and 9, and as its tooth K' is engaged with the ratchet the same is partially rotated, as previously stated. A suitable spring K⁵, having one end secured at K⁶ to the bracket J and the other to an eye K⁷ upon the sliding support or block K³, retracts the block to its normal position immediately after the passage of the cam-tooth l² of the cam l'.

The feeder L preferably consists of a frictionally-engaging roller mounted upon the shaft l and rotating in the direction shown by arrow 3 at Figs. 1 and 3 for forcing the articles to be stacked directly against the engaging face h² of the contact-piece H. It will thus be evident that as a single article to be stacked is fed forward by said roller L its advancing end forces the engaging face or roller h² backwardly from in front of the upright wall G, and thereby rocks the lever I through the medium of the bar or lever h and the arm h² and permits the depression of the dog K into engagement with the ratchet K², as previously described.

As best seen at Figs. 1 and 2, the portion of the periphery of the feeder or roller L adapted to engage the articles to be stacked projects beyond the vertical plane of the inner face of the wall G, and in order to positively insure engagement of the advancing end of the article to be stacked with the engaging face or roller h² of the movable contact-piece H for bringing the assembling-carrier into action I provide a roller o, adapted to form part of an auxiliary carrier-actuating mechanism, as presently described, which is arranged in advance of the feeder or roller L or in greater proximity toward the assembling-carrier and causes the article to be stacked to follow the periphery of the roller L until it engages the front face of the wall G and the engaging face h² of the contact-piece H.

N represents the resetting contact-piece for returning the contact-piece H to its normal position, thus aiding the spring H⁴ in its operation, and as here illustrated this contact-piece N consists of the opposite end of the strips forming the bar h and an engaging face or loosely-revoluble roller n, journaled at n' at the extreme end of said contact-piece N. It is thus evident that the contact-pieces H and N form a continuous lever, the inner end of which carries the roller $h^2$, adapted to be forced outwardly by the front end of the advancing article to be stacked, and that the roller $n$ at the rear end of said lever is by the backward movement of the roller $h$ forced into the path of said article. As the letter or other article continues its onward movement it encounters the roller $n$, forces the same backwardly, and thereby resets the contact-piece H to its normal position by rocking the same forwardly until its engaging face or roller $h^2$ projects beyond the front face of the wall G into position to be again engaged by the advancing end of the succeeding article to be stacked. This resetting of the contact-piece H returns the lever I to its normal position, as previously stated, and causes the said lever to normally hold the dog K out of engagement with the ratchet-wheel $K^2$. It is thus evident that as the dog K is normally held out of engagement with the ratchet-wheel $K^2$ the continuous movement of the cam $l'$, in connection with the spring $K^5$, continually reciprocates the dog K, but does not transmit motion to the carrier until the contact-piece is actuated to release the dog K from its inoperative position, whereupon the reciprocal movement of the dog effects the partial revolution of the ratchet-wheel $K^2$ and a constant movement of the carrier. The movement of the carrier is slight, however, and merely sufficient to force the articles to be stacked a slight distance along the stacking or assembling table or tray in order to obviate close packing thereof at the rear end of said table or tray in proximity to the upright wall G, which would tend to retard the fluency of the feed and the successive feeding of the letters one behind the other. It is evident, however, that the described form of contact-piece H and connecting mechanism between the same and the assembling-carrier-actuating mechanism for effecting the movement of the carrier upon the presence in front of the wall G of the article to be stacked and the consequent engagement of the contact-piece with said article is only one form of such mechanism suitable for carrying out my invention, and that the same is not limited to any specific construction of contact-piece in the path of the article to be stacked and adapted to make contact therewith and bring the carrier into action. Consequently I do not herein limit myself to the described form of contact-piece or connecting mechanism between said contact-piece and the carrier.

Upon practical operation of my invention it has been noted that the contact-piece can project only a slight distance beyond the forward face of the upright wall G, as otherwise the fluency of the feed is retarded and a thin letter, postal card, or analogous article is unable to effect the required action of said contact-piece. Consequently when thick letters are passed to the stacker the slight projection of the contact-piece and the consequent limited movement of the assembling-carrier effected by the described construction of connecting mechanism between the contact-piece and the assembling-carrier is insufficient to produce the required movement of the carrier. I therefore provide an auxiliary carrier-actuating mechanism O, the construction and operation of which serve to add to the utility of my invention. This mechanism O consists, preferably, of an engaging face or roller $o$, loosely mounted upon a spindle $o'$, supported by links or yielding bearings $o^2$, hinged to the bracket J, previously described.

Figure 7:
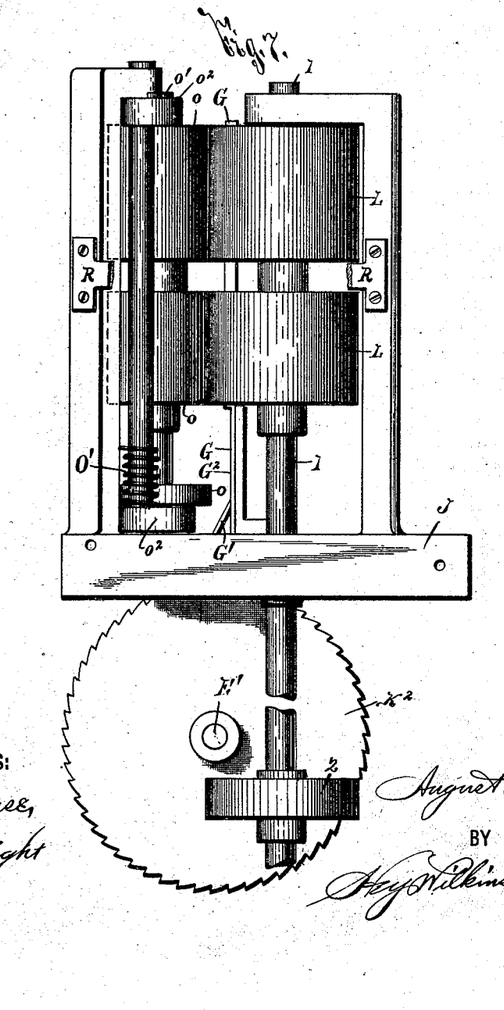

At the lower end of the shaft $o'$ is a small loosely-revoluble roller $o^3$, which engages the forked end $o^4$ of a projecting arm $o^5$ upon the support or bar $K^3$. This roller $o$, as best seen at Figs. 1 and 3, is normally forced against the periphery of the feeding-roller L by a spring $O'$, Fig. 7, having one end secured to the lower link $o^2$ and the other to the bracket J, and it is evident that as a thick letter intervenes between the rollers L and $o$ in its forward passage to my improved stacker the sliding support or bar $K^3$ is moved forwardly a distance corresponding to the thickness of the letter. It is also evident that as the advancing end of a thick letter or other article, which is its thinnest portion and is compressed by the rollers L and $o$, emerges from between said rollers it operates the contact-piece H and thereby permits the dog K to engage the ratchet-wheel $K^2$ and partially rotate the same as the remainder and thicker portion of the letter or other article passes between the rollers L and $o$. The movement of the support or bar $K^3$, carrying the dog K, is, however, independent of the movement of said bar, effected by the cam $l'$ and may cause the carrier to move a much greater distance than said cam as the support $K^3$ is moved forwardly a distance corresponding to the thickness of the letter.

I have also discovered upon practical operation of my invention that the articles to be stacked, feeding rapidly to the stacker, are more or less liable to rest against the contact-piece H when their forward movement is stopped and prevent its operation by the succeeding article; but this undesirable result is totally obviated by the roller $o$, which, as it revolves in the direction shown by arrow 4 at Figs. 1 and 3, tends to force forwardly the ends of the letters in contact with said roller, and by a guard-rib P, secured to the front face of the wall G at the outside of the roller $h^2$ of the contact-piece. This rib is formed with the inner incline $p$, the forwardly-extending central portion $p'$, and the outer incline $p^2$, and is preferably of less length than the distance between the rollers $h^2$ and $n$ in order that the articles to be stacked may return the roller $n$ to its normal position and reset the contact-piece H.

As illustrated by dotted lines at Fig. 1, the roller $o$ and a guard P cause the articles to be stacked to incline forwardly at their inner extremities, and thereby present an open space between the inner end of the last-stacked article and the adjacent face of the upright wall G, thus insuring a successive feed of the letters one within the other and permitting a fluent feed of the articles to be stacked one within the other.

In order that the articles may feed directly from the rollers B C between the rollers L and o, they may be guided in their passage by suitable guides R, Figs. 1 and 3, consisting of spring-bars of desirable form, size, and construction curving outwardly from the rollers L o.

My improved stacker is provided with a suitable stop S, Figs. 1 and 17, for limiting the movement of articles fed thereto. This stop is preferably adjustably supported on the upright wall G and consists of a head having a groove S' for receiving the upper edge of said wall G and a depending stop-plate arranged in the path of articles fed to said stacker. A suitable clamp $S^2$, passed through an ear $S^3$, holds the stop-plate firmly in its adjusted position.

The operation of my invention will be readily perceived from the foregoing description and upon reference to the drawings, and it will be particularly noted that its parts are simple in construction and operation, that the articles to be stacked are fed positively along the stacking or assembling table or tray by an assembling-carrier brought into action by the presence of the article feeding to said table or tray, that a thick article causes the assembling-carrier to be fed a greater distance, and that the advancing end of the separate articles to be stacked is free to feed within the rear end of the preceding article. It is evident, however, that considerable change may be made in the relative construction and arrangement of the parts of my stacker without departing from the spirit of my invention. Hence I do not herein limit myself to such detail construction and arrangement.

Having thus fully described my invention, what I claim as new, and desire to secure by Letters Patent, is—

1. The combination of a movable carrier upon which the articles are stacked, a movable contact-piece projecting into the path of said articles for making contact therewith, and connections between said carrier and contact-piece, whereby the contact-piece controls the action of the carrier, substantially as described.

2. The combination of a movable carrier normally at rest upon which the articles are stacked, mechanism for operating said carrier, a movable contact-piece projecting into the path of said articles for making contact therewith, and connections between said mechanism and the contact-piece for operatively connecting said mechanism to the carrier, substantially as specified.

3. The combination of mechanism for feeding the articles to be stacked, a movable carrier upon which the articles are stacked, a movable contact-piece projecting into the path of said articles for making contact therewith, and connections between said carrier and contact-piece, whereby the contact-piece controls the action of the carrier, substantially as set forth.

4. The combination of conjointly-operating rollers for successively feeding letters or analogous articles, and a movable carrier upon which the articles fed by the rollers are stacked; of a movable contact-piece projecting into the path of said articles for making contact therewith, and connections between said carrier and contact-piece, whereby the contact-piece controls the action of the carrier, substantially as and for the purpose set forth.

5. The combination of mechanism for feeding the articles to be stacked, a movable carrier normally at rest upon which the articles are stacked, continuously-operating mechanism for actuating the carrier, a contact-piece projecting into the path of said articles for making contact therewith, and connections between the continuously-operating mechanism and the contact-piece for intermittently connecting said mechanism with the carrier, substantially as specified.

6. The combination of conjointly-operating feeding-rollers for the articles to be stacked, a portion of the face of one roller being arranged in advance of the corresponding portion of the face of the other roller, a carrier upon which the articles are stacked, a movable contact-piece projecting into the path of said articles for making contact therewith, and connections between said carrier and contact-piece, whereby the contact-piece controls the action of the carrier, substantially as described.

7. The combination of a movable carrier for the articles to be stacked, a movable contact-piece projecting into the path of said articles for making contact therewith, connections between said carrier and contact-piece, whereby the contact-piece controls the action of the carrier, and a guard for holding the stacked articles away from the contact-piece, substantially as specified.

8. The combination of a movable carrier for the articles to be stacked, a movable contact-piece projecting into the path of said articles for making contact therewith, connections between said carrier and contact-piece, whereby the contact-piece controls the action of the carrier, and an adjuster for varying the movement of said contact-piece, substantially as set forth.

9. The combination of a movable carrier for the articles to be stacked, a movable contact-piece projecting into the path of said articles for making contact therewith, connections between said carrier and contact-piece, whereby the contact-piece controls the action of the carrier, and a second contact-piece for making contact with said articles and resetting the former contact-piece, substantially as described.

10. The combination of a movable carrier for the articles to be stacked, a movable contact-piece projecting into the path of said articles for making contact therewith, connections between said carrier and contact-piece, whereby the contact-piece controls the action of the carrier, and a guide, as R, for conducting the articles to said contact-piece, substantially as specified.

11. The combination of a movable carrier normally at rest upon which the articles are stacked, mechanism for operating said carrier, a movable contact-piece projecting into the path of said articles for making contact therewith, connections between said mechanism and the contact-piece for operatively connecting said mechanism to the carrier, and a second movable contact-piece for making contact with said articles and resetting the former contact-piece, substantially as set forth.

12. The combination of a movable carrier for the articles to be stacked, a movable contact-piece projecting into the path of said articles for making contact therewith, an engaging face movably mounted in proximity to the path of said articles and movable outwardly therefrom by the passage of thick articles, and connections between said carrier, contact-piece, and engaging face, whereby the contact-piece and engaging face control the action of the carrier, substantially as described.

13. The combination of a movable carrier for the articles to be stacked, a pivoted lever having separated engaging faces for alternately projecting into the path of said articles, and connections between said carrier and lever, whereby the lever controls the action of the carrier, substantially as set forth.

14. The combination of a movable carrier for the articles to be stacked, a pivoted lever having separated engaging faces for alternately projecting into the path of said articles, connections between said carrier and lever, whereby the lever controls the action of the carrier, and a guard interposed between said engaging faces of the lever for forcing the preceding article from the advancing end of the succeeding article, substantially as described.

15. The combination of a movable carrier for the articles to be stacked, a pivoted lever provided with rollers at its opposite extremities for alternately projecting into the path of said articles, an adjuster for varying the amount of projection of one of said rollers, and connections between said carrier and lever, whereby the lever controls the action of the carrier, substantially as specified.

16. The combination of a movable carrier for the articles to be stacked, a pivoted lever provided with rollers at its opposite extremities for alternately projecting into the path of said articles, a spring for throwing one of the rollers into the path of said articles, an adjuster for varying the amount of projection of said roller, and connections between said carrier and lever, whereby the lever controls the action of the carrier, substantially as and for the purpose set forth.

17. The combination of a movable carrier for the articles to be stacked, a revoluble shaft in proximity to the carrier, a wheel for operating the carrier, a movable dog for actuating said wheel, a cam on the revoluble shaft for operating the dog, a contact-piece projecting into the path of said articles for making contact therewith, and connections between said dog and contact-piece for forcing the dog into operative position, substantially as described.

18. The combination of a movable carrier for the articles to be stacked, a revoluble shaft in proximity to the carrier, a wheel for operating the carrier, a movable dog for actuating said wheel, a cam on the revoluble shaft for operating the dog, a contact-piece projecting into the path of said articles for making contact therewith, connections between said dog and contact-piece for forcing the dog into operative position, and a second contact-piece for encountering the mail-matter and resetting said dog, substantially as specified.

19. The combination of a movable carrier for the articles to be stacked, a revoluble shaft in proximity to the carrier, a wheel for operating the carrier, a movable dog for actuating said wheel, a cam on the revoluble shaft for operating the dog, a lever for holding said dog out of engagement with the wheel, a contact-piece projecting into the path of said articles for making contact therewith, and connections between said lever and contact-piece for rocking the lever and permitting the dog to engage the wheel, substantially as described.

20. The combination of a movable carrier for the articles to be stacked, a wheel for operating the carrier, a movable dog for actuating said wheel, a sliding support for moving the dog, an engaging face arranged in proximity to the path of said articles, and connections between the sliding support and the engaging face for operating said sliding support, substantially as specified.

21. The combination of a movable carrier for the articles to be stacked, a revoluble shaft in proximity to the carrier, a wheel for operating the carrier, a movable dog for actuating the wheel, a cam on the revoluble shaft for operating the dog, a contact-piece projecting into the path of said articles for controlling the operation of the dog, an engaging face arranged in proximity to the path of the mail-matter for operating said dog to partially rotate the wheel, and connections between the movable dog and said contact-piece and engaging face, whereby the contact-piece and engaging face control the action of the movable dog, substantially as set forth.

22. The combination with a table having projecting guides and mechanism supported on said table for feeding the articles to be stacked; of a table or tray for receiving the articles discharged from the feeding mechanism and provided with ways for receiving the guides of the former table, and a carrier movable longitudinally along the table or tray and having its upper face projecting above the corresponding face of said table or tray for feeding the articles along the same, substantially as specified.

23. The combination with mechanism for feeding articles edgewise; of a wall along which the articles are fed, a guard on said wall for forcing the previously-stacked articles from the wall to permit entrance of the succeeding article behind the former one, and a shoulder projecting from said wall for supporting the lower edge of the letters, substantially as and for the purpose set forth.

24. The combination with mechanism for feeding the articles to be stacked, a table or tray for receiving the articles discharged from the feeding mechanism, a wall along which the articles are fed provided with a projecting shoulder arranged directly beneath the path of said articles for supporting the lower edges thereof, and a carrier movable in a plane in close proximity to said shoulder for feeding said articles, substantially as described.

25. The combination of mechanism for feeding marked articles edgewise; of a wall along which the articles are fed provided with a recess or groove arranged opposite to the path of the part of the article bearing the freshly-impressed mark or stamp for preventing smearing of said mark, substantially as and for the purpose specified.

26. The combination of mechanism for feeding the articles to be stacked, a support for the lower edges of said articles, a carrier for feeding the articles along said support, a contact-piece projecting into the path of said articles for making contact therewith, and connections between said carrier and contact-piece, whereby the contact-piece controls the action of the carrier, substantially as specified.

27. The combination of mechanism for feeding the articles to be stacked, an inclined support for said articles, a carrier arranged beneath said support, a contact-piece projecting into the path of said articles for making contact therewith, and connections between said carrier and contact-piece, whereby the contact-piece controls the action of the carrier, substantially as described.

Signed at New York, in the county of New York and State of New York, this 14th day of January, A. D. 1892.

AUGUST BERTRAM.

Witnesses:
 IRVING RULAND,
 ISAAC P. STORM.